US012614889B1

(12) United States Patent
Li et al.

(10) Patent No.: US 12,614,889 B1
(45) Date of Patent: Apr. 28, 2026

(54) NARROW-LINEWIDTH BRILLOUIN LASER STABILIZED BY OPTICAL SELF-INJECTION LOCKING

(71) Applicant: HQPHOTONICS INC., Pasadena, CA (US)

(72) Inventors: Jiang Li, Alhambra, CA (US); Kerry Vahala, Pasadena, CA (US)

(73) Assignee: HQPHOTONICS INC., Pasadena, CA (US)

( * ) Notice: Subject to any disclaimer, the term of this patent is extended or adjusted under 35 U.S.C. 154(b) by 0 days.

(21) Appl. No.: 19/412,866

(22) Filed: Dec. 9, 2025

Related U.S. Application Data

(62) Division of application No. 18/098,628, filed on Jan. 18, 2023.

(60) Provisional application No. 63/300,524, filed on Jan. 18, 2022.

(51) Int. Cl.
| | |
|---|---|
| *H01S 3/131* | (2006.01) |
| *H01S 3/067* | (2006.01) |
| *H01S 3/094* | (2006.01) |
| *H01S 3/0941* | (2006.01) |
| *H01S 3/30* | (2006.01) |

(52) U.S. Cl.
CPC ........ *H01S 3/1312* (2013.01); *H01S 3/06791* (2013.01); *H01S 3/094003* (2013.01); *H01S 3/094096* (2013.01); *H01S 3/0941* (2013.01); *H01S 3/302* (2013.01)

(58) Field of Classification Search
CPC ........... H01S 3/06791; H01S 3/094003; H01S 3/094096; H01S 3/0941; H01S 3/1312; H01S 3/302
See application file for complete search history.

(56) References Cited

U.S. PATENT DOCUMENTS

| | | | | |
|---|---|---|---|---|
| 10,823,571 | B1 * | 11/2020 | Wu | G01C 19/727 |
| 10,928,200 | B1 * | 2/2021 | Wu | H01S 3/094076 |
| 11,506,495 | B2 * | 11/2022 | Wu | G01C 19/721 |
| 2017/0302048 | A1 * | 10/2017 | Li | H01S 3/1305 |
| 2018/0205463 | A1 * | 7/2018 | Karpov | G02F 1/073 |

(Continued)

*Primary Examiner* — Rhonda S Peace
(74) *Attorney, Agent, or Firm* — David S. Alavi

(57) ABSTRACT

A ring optical resonator is characterized by a Brillouin shift frequency $\Omega_a$. A first pump laser source produces a first pump optical signal at a first pump optical frequency $v_{1P}$ and launches it into the ring optical resonator to propagate in a forward direction around the ring optical resonator. A back-scattered portion of the first pump optical signal propagates back to the first pump laser source and injection-locks it so that the first pump optical frequency $v_{1P}$ is locked to a first resonant mode optical frequency of the ring optical resonator. The first pump optical signal circulating in the ring optical resonator results in a first stimulated Brillouin laser (SBL) optical signal at a first SBL optical frequency $v_1 = v_{1P} - \Omega_a$ that resonantly propagates in a backward direction around the ring optical resonator at a different resonant mode optical frequency of the ring optical resonator.

21 Claims, 4 Drawing Sheets

(56)　　　　　　　References Cited

U.S. PATENT DOCUMENTS

| 2021/0333106 | A1* | 10/2021 | Wu | ......................... | H01S 3/0675 |
| 2022/0221769 | A1* | 7/2022 | Xie | ......................... | H01S 3/105 |

\* cited by examiner

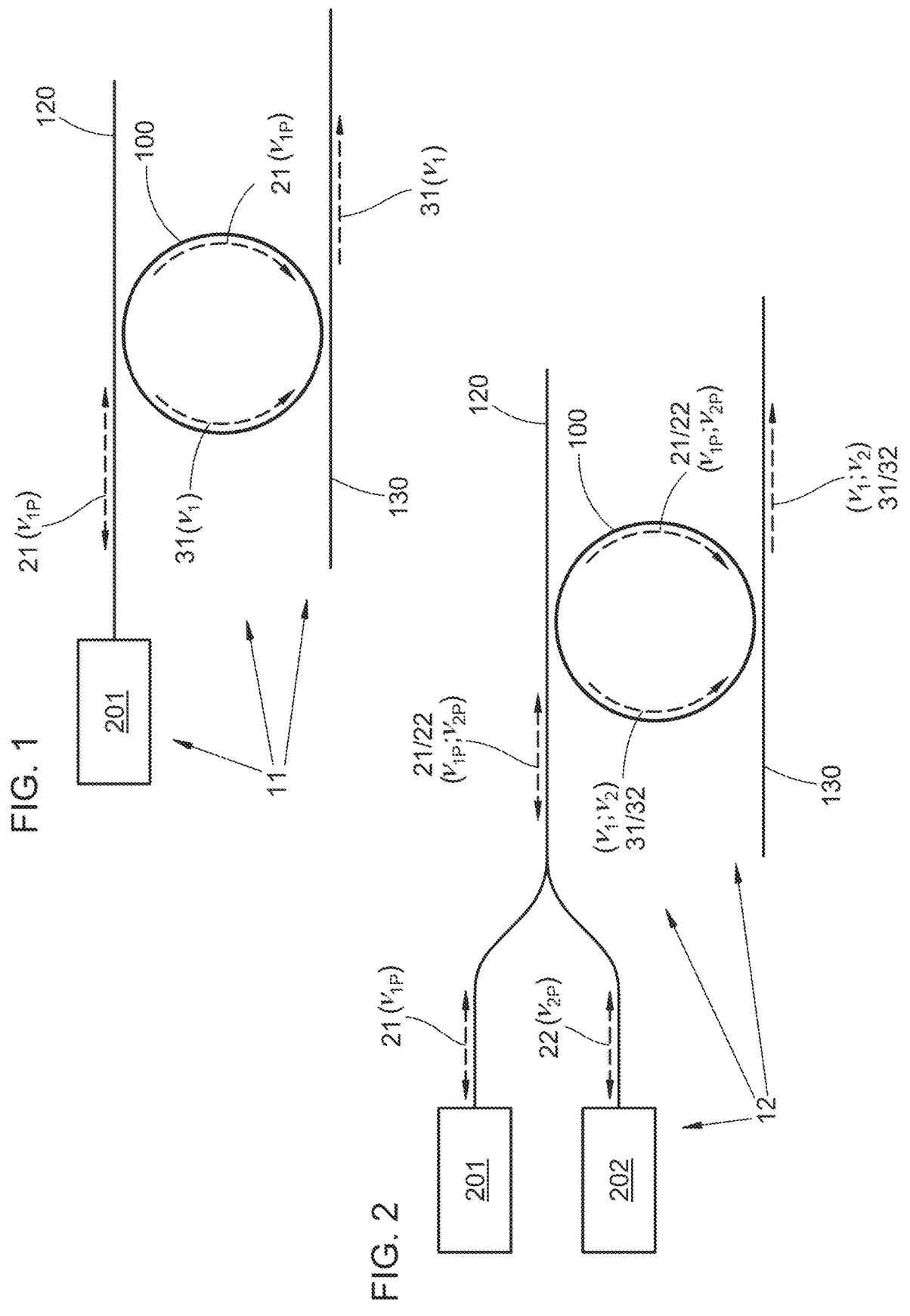

NARROW-LINEWIDTH BRILLOUIN LASER STABILIZED BY OPTICAL SELF-INJECTION LOCKING

BENEFIT CLAIM

This application is a division of U.S. non-provisional application Ser. No. 18/098,628 entitled "Narrow-linewidth Brillouin laser stabilized by optical self-injection locking" filed Jan. 18, 2023 in the names of Li et al, which in turn claims benefit of U.S. provisional App. No. 63/300,524 entitled "Narrow-linewidth Brillouin laser stabilized by optical self-injection locking" filed Jan. 18, 2022 in the names of Li et al; both of said applications are incorporated herein by reference in their entireties.

STATEMENT REGARDING FEDERALLY SPONSORED RESEARCH OR DEVELOPMENT

This invention was made with government support under Contract No. W912CG20C0034 awarded by the United States Army. The government has certain rights in the invention.

FIELD OF THE INVENTION

The field of the present invention relates to Brillouin lasers. In particular, apparatus and methods for frequency stabilization of a Brillouin laser using self-injection locking are disclosed herein.

BACKGROUND

Some relevant background information relevant to laser frequency stabilization or Brillouin lasers can be found in:

[1] Drever, R. et al; Laser phase and frequency stabilization using an optical resonator; Applied Physics B 31, 97-105 (1983).

[2] Hansch, T. & Couillaud, B.; Laser frequency stabilization by polarization spectroscopy of a reflecting reference cavity; Optics communications 35, 441-444 (1980).

[3] Young, B., Cruz, F., Itano, W. & Bergquist, J.; Visible lasers with subhertz linewidths; Physical Review Letters; 82, 3799 (1999).

[4] Jin, W. et al.: Hertz-linewidth semiconductor lasers using CMOS-ready ultra-high-Q microresonators; Nature Photonics 15, 346-353 (2021).

[5] Li, B. et al; Reaching fiber-laser coherence in integrated photonics; Optics Letters 46, 5201-5204 (2021).

[6] Shen, B. et al; Integrated turnkey soliton microcombs; Nature 582, 365-369 (2020).

[7] Stokes, L., Chodorow, M. & Shaw, H.; All-fiber stimulated Brillouin ring laser with submilliwatt pump threshold; Optics Letters 7, 509-511 (1982).

[8] Smith, S., Zarinetchi, F. & Ezekiel, S. Narrow-linewidth stimulated Brillouin fiber laser and applications; Optics letters 16, 393-395 (1991).

[9] Geng, J. et al; Highly stable low-noise Brillouin fiber laser with ultranarrow spectral linewidth; IEEE Photonics Technology Letters 18, 1813-1815 (2006).

[10] Lee, H. et al; Chemically etched ultrahigh-Q wedge-resonator on a silicon chip; Nature Photonics 6, 369-373 (2012).

[11] Li, J., Lee, H., Chen, T. & Vahala, K. J.; Characterization of a high coherence, Brillouin microcavity laser on silicon; Optics Express 20, 20170-20180 (2012).

[12] Pant, R. et al; On-chip stimulated Brillouin scattering; Optics express 19, 8285-8290 (2011).

[13] Debut, A., Randoux, S. & Zemmouri, J.; Linewidth narrowing in Brillouin lasers: Theoretical analysis; Physical Review A 62, 023803 (2000).

[14] Gundavarapu, S. et al; Sub-hertz fundamental linewidth photonic integrated Brillouin laser; Nature Photonics 13, 60-67 (2019).

[15] Fortier, T. M. et al; Generation of ultrastable microwaves via optical frequency division; Nature Photonics 5, 425-429 (2011).

[16] Swann, W. C., Baumann, E., Giorgetta, F. R. & Newbury, N. R.; Microwave generation with low residual phase noise from a femtosecond fiber laser with an intracavity electro-optic modulator; Optics express 19, 24387-24395 (2011).

[17] Li, J., Yi, X., Lee, H., Diddams, S. A. & Vahala, K. J.; Electro-optical frequency division and stable microwave synthesis; Science 345, 309-313 (2014).

[18] Li, J. & Vahala, K.; A 30 GHz ultra-low-phase-noise oscillator using electro-optical frequency division; 2017 IEEE Photonics Conference (IPC) (2017), 455-456.

[19] Vahala, K., Diddams, S., Li, J., Yi, X. & Hansuek, L.; Stabilized microwave-frequency source; U.S. Pat. No. 9,450,673 (September 2016).

[20] Li, J. & Vahala, K.; Optical frequency divider based on an electro-optical-modulator frequency comb; U.S. Pat. No. 9,905,999 (February 2018).

[21] Kippenberg, T. J., Gaeta, A. L., Lipson, M. & Gorodetsky, M. L.; Dissipative Kerr solitons in optical microresonators; Science 361 (2018).

[22] Lee, H. et al.; Spiral resonators for on-chip laser frequency stabilization; Nature Communications 4, 1-6 (2013).

[23] Bauters, J. F. et al; Planar waveguides with less than 0.1 dB/m propagation loss fabricated with wafer bonding; Optics Express 19, 24090-24101 (2011).

[24] Kondratiev, N. et al; Self-injection locking of a laser diode to a high-Q WGM microresonator; Optics Express 25, 28167-28178 (2017).

[25] Wang, H., Wu, L., Yuan, Z. & Vahala, K.; Towards milli-Hertz laser frequency noise on a chip; CLEO: Science and Innovations (2021), SF2O-2.

[26] Li, Jiang, Hansuek Lee, and Kerry J. Vahala; "Low-noise Brillouin laser on a chip at 1064 nm"; Optics Letters 39(2) 287-290 (2014).

[27] Spirin et al; "Single-mode Brillouin fiber laser passively stabilized at resonance frequency with self-injection locked pump laser"; Laser Physics Letters 9(5) 377-380 (2012).

[28] Spirin et al; "Stabilizing DFB laser injection-locked to an external fiber-optic ring resonator"; Optics Express 28(1) 478 (2020).

[29] Korobko et al; "Self-injection-locking linewidth narrowing in a semiconductor laser coupled to an external fiber-optic ring resonator"; Optics Communications 405 253-258 (2017).

[30] Li, J. & Vahala, K.; Dual-frequency optical source; U.S. Pat. No. 9,537,571 (February 2018).

Each of the preceding references in incorporated by reference as if fully set forth herein.

Narrow-linewidth lasers with high coherence and low frequency noise are critical components in optical communications, optical atomic clocks, precision spectroscopy, remote sensing such as LIDAR, and microwave photonics. It has been shown that optical frequency locking techniques, such as the Pound-Drever-Hall frequency locking [1], or the Hansch-Couillaud frequency locking [2], can be used to reduce the linewidth (or frequency noise) of a semiconductor laser significantly by locking the semiconductor laser to an external high-quality-factor (high-Q-factor, or simply high-Q) reference cavity [3]. These frequency-locking techniques require external modulation electronics, external photodetectors, demodulation, and fast servo control electronics.

SUMMARY

An inventive apparatus includes a ring optical resonator and a first pump laser source. The ring optical resonator is characterized by a Brillouin shift frequency $\Omega_a$ and a free spectral range $\nu_{FSR}$. The first pump laser source (i) produces a first pump optical signal at a first pump optical frequency $\nu_{1P}$, and (ii) launches at least a portion of the first pump optical signal into the ring optical resonator to propagate in a forward direction around the ring optical resonator. A portion of the first pump optical signal backscattered by the ring optical resonator propagates back to the first pump laser source and injection-locks the first pump laser source so that the first pump optical frequency $\nu_{1P}$ is locked to a first resonant mode optical frequency of the ring optical resonator. A portion of the first pump optical signal circulating in the ring optical resonator results in a first stimulated Brillouin laser (SBL) optical signal at a first SBL optical frequency $\nu_1 = \nu_{1P} - \Omega_a$ that resonantly propagates in a backward direction around the ring optical resonator and is emitted from a resonant optical mode of the ring optical resonator at a resonant mode optical frequency that is lower than the first resonant mode optical frequency.

An inventive apparatus can further include a second pump laser source. The second pump laser source can (i) produce a second pump optical signal at a second pump optical frequency $\nu_{2P}$, and (ii) launch at least a portion of the second pump optical signal into the ring optical resonator to propagate in a forward direction around the ring optical resonator. A portion of the second pump optical signal backscattered by the ring optical resonator can propagate back to the second pump laser source and injection-lock the second pump laser source so that the second pump optical frequency $\nu_{2P}$ is locked to a second resonant mode optical frequency of the ring optical resonator different from the first resonant mode optical frequency. A portion of the second pump optical signal circulating in the ring optical resonator results in a second SBL optical signal at a second SBL optical frequency $\nu_2 = \nu_{2P} - \Omega_a$ that resonantly propagates in a backward direction around the ring optical resonator and is emitted from a resonant optical mode of the ring optical resonator at a resonant mode optical frequency that is lower than the second resonant mode optical frequency.

Objects and advantages pertaining to Brillouin lasers may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 illustrates schematically an example of a single self-injection-locked pump laser producing a single SBL optical signal.

FIG. 2 illustrates schematically an example of dual self-injection-locked pump lasers producing dual SBL optical signals.

FIG. 4 illustrates schematically use of the dual SBL optical signals of the example of FIG. 2 to produce an electrical output signal using an optical frequency divider.

Figure 3:
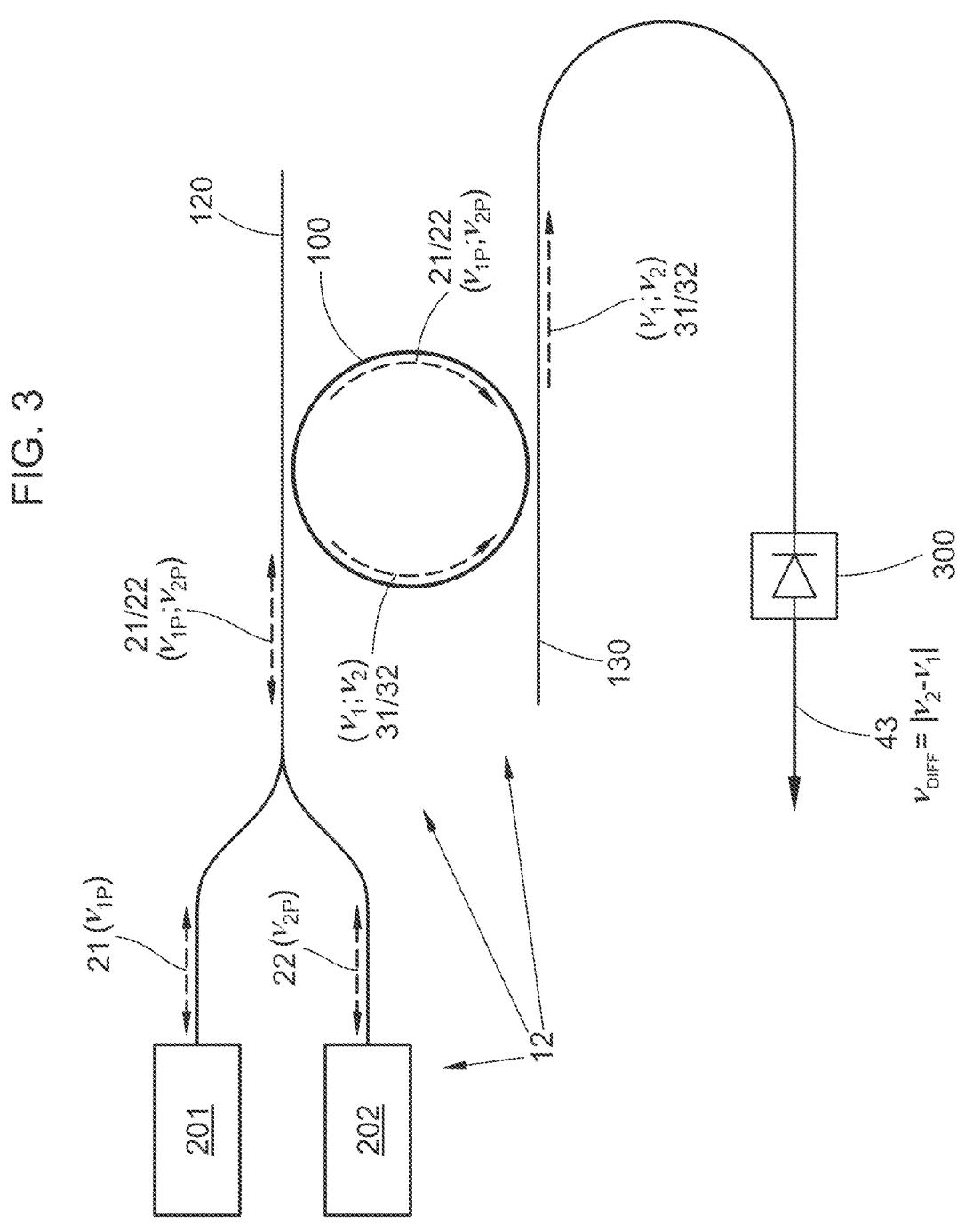
FIG. 3 illustrates schematically use of the dual SBL optical signals of the example of FIG. 2 to produce an electrical output signal at their difference frequency.

The embodiments depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. The embodiments shown are only examples and should not be construed as limiting the scope of the present disclosure or appended claims.

DETAILED DESCRIPTION

The following detailed description should be read with reference to the drawings, in which identical reference numbers refer to like elements throughout the different figures. The drawings, which are not necessarily to scale, depict selective examples and are not intended to limit the scope of the inventive subject matter. The detailed description illustrates by way of example, not by way of limitation, the principles of the inventive subject matter.

Stimulated Brillouin scattering (SBS) is a nonlinear interaction between photons and high-frequency GHz-rate acoustic phonons due to electrostriction and photoelastic effects. Stimulated Brillouin lasers (SBLs) have been demonstrated in fiber optical resonators [7-9], on-chip microresonators [10, 11], and on-chip waveguides [12]. In a high-Q resonator, use of SBS produces highly coherent, narrow-linewidth lasers with low fundamental frequency noise [10, 11]. Moreover, the physics of SBS greatly suppresses coupling of technical noise into the Brillouin lasing field from the pumping laser [13]. Chip-based Brillouin lasers have been demonstrated previously with sub-Hertz-level fundamental linewidth in high-Q silica disk resonators [10, 11] and silicon nitride ring resonators [14]. In those previous Brillouin laser demonstrations, the pump laser is locked to the external high-Q resonator by various frequency-locking techniques [1, 10, 11, 14], which include frequency modulation/demodulation, an external photodetector, and locking electronics.

A simpler scheme is disclosed herein that can be employed to stabilize an inventive narrow-linewidth Brillouin laser, in which is employed self-injection locking (SIL) of a pump semiconductor laser to an external high-Q optical resonator cavity. In some examples the external high-Q optical resonator can be in the form of a whispering-gallery-mode microresonator (e.g., a ring, disk, or spiral resonator) or a fiber-loop resonator. In some examples, dual Brillouin lasers co-lasing from the high-Q optical resonator can be stabilized by self-injection locking of two semiconductor pump lasers (at two different pump wavelengths) to a single high-Q optical resonator. Such dual Brillouin lasers stabilized by SIL can be used in some instances as optical references for low-phase-noise microwave generation using, e.g., direct detection on a fast photodetector, or optical frequency division using a frequency comb (such as a modelocked laser frequency comb [15, 16], an electro-optical frequency comb [17-20], or a microcomb [21]).

An example of an inventive apparatus 11 is illustrated schematically in FIG. 1 and includes a first pump laser 201 and a ring optical resonator 100. The ring optical resonator can be of any suitable type or arrangement [10, 11, 14, 22, 23], e.g., a whispering gallery mode microresonator (such as a ring/spiral resonator, a disk resonator, a silica spiral resonator [22], an integrated silicon nitride ($Si_3N_4$, referred to herein as SiN) ring resonator [14], or a SiN spiral resonator [23]) or a fiber-loop optical resonator [30]; other suitable materials or arrangements of the ring optical resonator 100 can be employed. The ring optical resonator 100 is characterized by a Brillouin shift frequency $\Omega_a$ and a free spectral range $v_{FSR}$; $\Omega_a$ can be about equal to $v_{FSR}$ or an integer multiple of $v_{FSR}$. In some examples the optical resonator 100 comprises silica and the Brillouin shift frequency $\Omega_a$ of the optical resonator 100 is about 10.9 GHz; other materials with different Brillouin shift frequencies can be employed. In some examples the optical resonator 100 can exhibit a Q-factor greater than $10^4$, greater than $10^5$, greater than $10^6$, greater than $10^7$, or greater than $10^8$.

Input and output waveguides 120 and 130, respectively, are evanescently coupled to the optical resonator 100. The evanescent optical coupling can be achieved in any suitable or desirable way. In some examples, directional couplers can be employed for evanescent coupling between a fiber-loop resonator 100 and single-mode optical fibers acting as the waveguides 120/130. In some examples one or more fiber tapers can be employed as the waveguide 120/130 for evanescent coupling to a disk resonator 100. In some examples the waveguides 120/130 can be positioned on or formed from a substrate for evanescent coupling to a waveguide ring optical resonator 100 also positioned on or formed from that substrate. Other suitable arrangements can be employed.

The first pump laser 201 can be of any suitable type of arrangement; in some examples the first pump laser 201 can be a semiconductor diode laser, such as a distributed feedback (DFB) laser. The first diode laser 201 produces a corresponding first pump optical signal 21 at a corresponding first pump optical frequency $v_{1P}$. In some examples the first pump optical frequency $v_{1P}$ can be greater than 75 THz, greater than 120 THz, greater than 150 THz, less than 300 THz, less than 430 THz, or less than 750 THz (i.e., a corresponding first pump wavelength less than 4 μm, less than 2.5 μm, less than 2 μm, greater than 1 μm, greater than 0.7 μm, or greater than 0.4 μm).

The first pump laser source 201 can be coupled to the waveguide 120 in any suitable way; in some examples butt-coupling to an optical fiber (e.g., silica) or to an integrated waveguide (e.g., silicon, silicon oxide, silicon nitride, or silicon oxynitride) can be employed. At least a portion of the first pump optical signal 21 propagates along the input waveguide 120 and is launched into the ring optical resonator 100 to propagate in a forward direction around the ring optical resonator 100. A small amount of the first pump optical signal 21 is backscattered from the optical resonator 100 and propagates backward along the waveguide 120 to the first pump laser source 201, e.g., the backscattered portion propagates backward along the same propagation path followed by the pump optical signal 21 from the pump laser source 201 to the optical resonator 100, typically without requiring any additional optical element, fiber, or waveguide for that purpose (in contrast to, e.g., [27, 28, 29]). That backscattered optical signal provides a feedback mechanism between the first pump laser source 201 and the optical resonator 100 by self-injection locking (SIL). The intensity of the backscatter is larger when the optical power circulating in the optical resonator 100 is larger, and the largest circulating optical power occurs when the first pump optical frequency $v_{1P}$ coincides with a resonant mode frequency of the optical resonator 100. The self-injection locking therefore serves to lock the first pump optical frequency $v_{1P}$ to a corresponding first resonant mode optical frequency of the optical resonator 100 [4, 5, 24]. Such self-injection locking greatly reduces phase noise and frequency bandwidth of the first pump optical signal 21. The higher the Q-factor of the optical resonator 100, the greater the corresponding reduction of phase noise and bandwidth of the first pump optical signal 21.

Once SIL is established between the first pump laser source 201 and the optical resonator 100, the power of the first pump optical signal 21 can be increased to exceed the simulated Brillouin scattering threshold will enable stimulated Brillouin laser (SBL) emission from the optical resonator 100. Due to momentum conservation between the first pump optical signal 21 (at the first pump optical frequency $v_{1P}$), a first SBL optical signal 31 (at a first SBL optical frequency $v_1$), and an acoustic wave in the material of the optical resonator 100 (at frequency $\Omega_a$), the first SBL optical signal 31 counterpropagates around the optical resonator 100 with respect to the first pump optical signal 21. A portion of the first SBL optical signal 31 exits the optical resonator 100 to propagate along the output waveguide 130. The first SBL optical frequency of the first SBL optical signal 31 is downshifted from the first pump optical signal 21 due to energy conservation, so that $v_1 = v_{1P} - \Omega_a$. To achieve stimulated Brillouin laser oscillation, another resonant mode optical frequency of the optical cavity 100 should lie within the gain bandwidth of stimulated Brillouin scattering within the optical cavity 100 (hence the need for $\Omega_a$ to be about equal to $v_{FSR}$ or an integer multiple of $v_{FSR}$). In some examples this can be achieved by engineering the optical resonator 100 higher transverse mode [25], or the free spectral range of the optical resonator 100 [10, 11, 26]. In some examples the optical resonator 100 can exhibit a free spectral range that is quite small (e.g., a fiber-loop resonator 100 that is 10s or 100s of meters long) so that multiple resonant mode frequencies might fall within the bandwidth of the stimulated Brillouin gain.

Due to self-injection locking, the free-running frequency noise of the semiconductor laser chip can be suppressed by up to 50 dB or more [4, 5]. Further, due to the frequency noise suppression mechanism in stimulated Brillouin scattering [11, 13], the generated first SBL optical signal 31 exhibits significantly lower technical noise than that exhibited by the first pump optical signal 21.

Another example is illustrated schematically in FIG. 2, wherein dual Brillouin lasers can be stabilized by self-injection locking of dual pump laser sources 201/202 to the optical resonator 100. Two laser sources 201/202 (e.g., semiconductor diode lasers such as DFB lasers) produce corresponding first and second pump optical signals 21/22 at two different corresponding pump optical frequencies $v_{1P}$ and $v_{2P}$. The arrangement and operation of the pump laser sources 201/202 and coupling of the corresponding first and second pump optical signals 21/22 in the optical resonator 100 can be in any of the ways described above for a single pump laser source. An input power combiner (such as a directional coupler, or Y-junction power combiner) can be employed to combine the two pump optical signals 21/22 to propagate together along the input waveguide 120 and couple into the optical resonator 100. Alternatively, each of the pump laser sources 201/202 can have its own dedicated input waveguide, and each of the corresponding pump optical signals 21/22 can be coupled into the optical resonator 100 independently of the other. The respective pump optical frequencies $v_{1P}$ and $v_{2P}$ can be locked onto different corresponding resonant mode optical frequencies of the optical resonator 100 by self-injection locking (as described above for a single pump laser source).

Once SIL is established between each pump laser source 201/202 and the optical resonator 100, increasing the power of the pump optical signals 21/22 over the simulated Brillouin scattering threshold will enable generation of corresponding first and second SBL optical signals 31/32 at corresponding SBL optical frequencies $v_1$ and $v_2$, each downshifted relative to its corresponding pump optical frequency by the Brillouin shift frequency $\Omega_a$, so that $v_1 = v_{1P} - \Omega_a$ and $v_2 = v_{2P} - \Omega_a$. The first and second SBL optical signals resonantly counterpropagate around the optical resonator 100 with respect to the pump optical signals 21/22, and a portion of each of those SBL optical signals 31/32 exits the optical resonator 100 via the output waveguide 130. Due to the co-lasing nature of the two SBL optical signals 31/32 in the same optical resonator 100 using SIL pump laser sources 201/202 locked to that same resonator 100, the common-mode technical frequency noise of the SBL optical signals 31/32, resulting from thermal, acoustic, and other environmental perturbations, significantly cancels out. Back-propagation of the SBL optical signals 31/32 (relative to the pump optical signals 21/22) results in suppression of unwanted pump optical signals 21/22 in the SBL optical signal output in the output waveguide 130. Accordingly, the two SBL optical signals 31/32 can serve as an optical reference that is well-suited for generating low-phase-noise electrical signals in the microwave frequency range (discussed below).

In some examples (e.g., as in FIG. 3) a low-phase-noise electronic signal 43 can be generated at microwave frequencies by directing the two SBL optical signals 31/32 at their corresponding SBL optical frequencies $v_1$ and $v_2$ onto a common photodetector 300, where a difference frequency at the microwave rate ($f_{diff} = |v_2 - v_1|$) can be generated from the beating of the photocurrent produced by the superposition of the SBL optical signals 31/32 on the fast photodetector 300. The phase noise of the resulting difference frequency signal 43 is determined by the relative frequency stability of the two SBL optical signals 31/32. It is expected that a phase noise of ~−85 dBc/Hz at 10 kHz offset for the difference frequency of $f_{diff}$ (e.g. 10 to 100 GHz) can be generated from the SBL optical signals 31/32 by SIL dual-pumping a 2-cm-round-trip silica disk or SiN ring resonator, and a phase noise of ~−100 dBc/Hz at 10 kHz offset for the difference frequency of $f_{diff}$ (e.g. 10-200 GHz) can be generated from the SBL optical signals 31/32 SIL dual-pumping a 1-meter-round-trip silica or SiN spiral resonator. The microwave difference frequency of $f_{diff}$ generated in this way is limited by the speed (i.e. bandwidth) of the photodetector 300, and can be less than 200 GHz, or less than 100 GHz.

Figure 4:
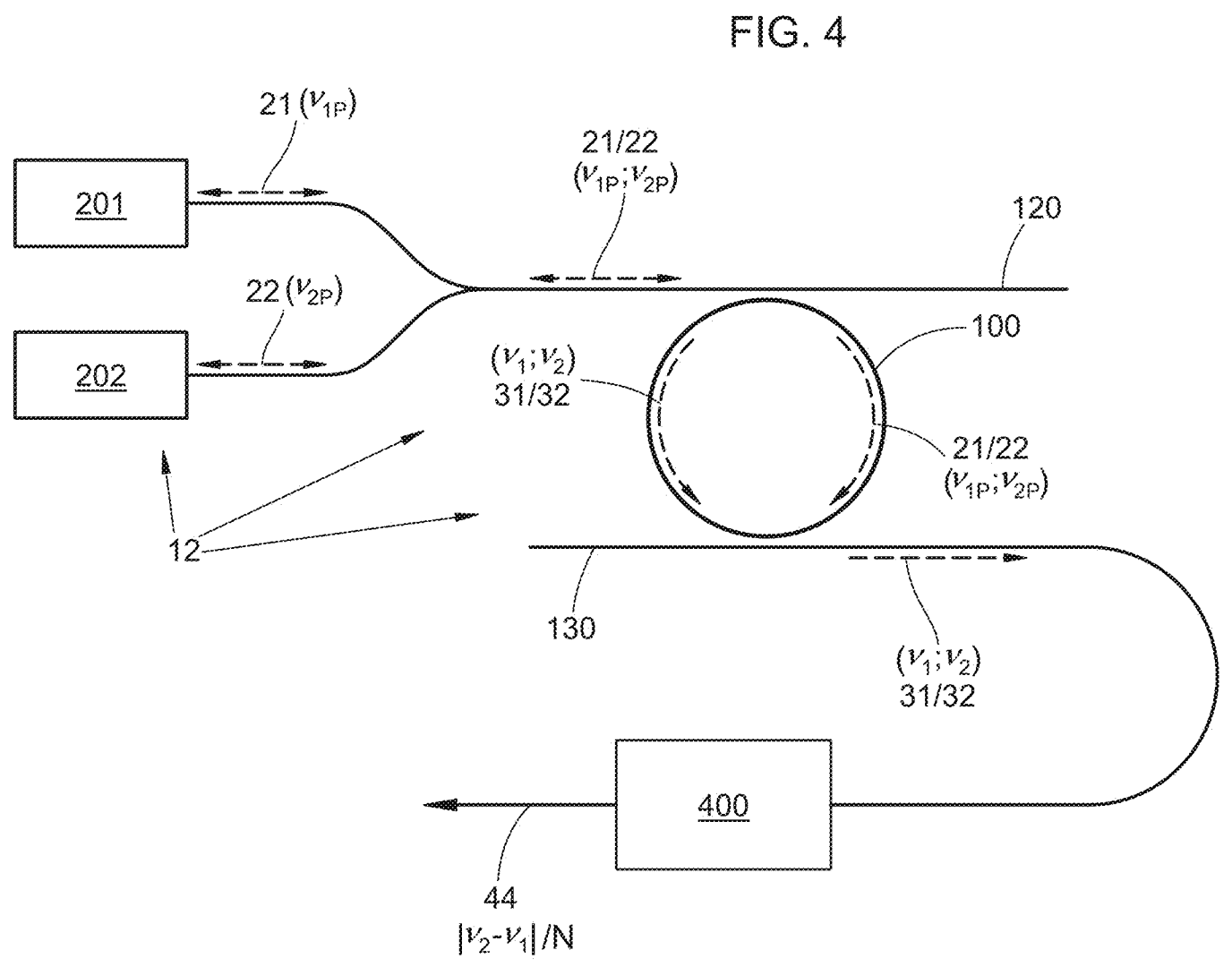

In some examples a low-phase-noise electronic signal 44 can be generated at microwave frequencies by optical frequency division of the two SBL optical signals 31/32 generated by SIL pumping using the laser sources 201/202 (e.g., as in FIG. 4). The two SBL optical signals 31/32 can be used as the dual optical reference for optical frequency division at their corresponding SBL optical frequencies $v_1$ and $v_2$. Optical frequency division has been demonstrated to generate ultra-low phase noise microwave signals by dividing the phase noise of the optical reference to the microwave domain [17]. The phase noise for the generated microwave signal 44 is divided by a factor of $N^2$ from the optical reference phase noise, where the integer N is the approximate frequency ratio between the optical reference frequency (i.e., $|v_2 - v_1|$) and the microwave output frequency (i.e., $|v_2 - v_1|/N$). Any suitable optical frequency divider 400 can be employed using any suitable frequency division technique, such as, e.g., using a mode locked laser comb [16], using a microresonator comb (microcomb) [21], or using an electro-optical comb [17, 18], or using any other suitable technique or arrangement, including those described above or in the incorporated references. When using the electro-optical comb, this technique can be referred to as electro-optical frequency division (eOFD) [17-20] and has been demonstrated to generate state-of-the-art, ultra-low phase noise microwave signals (e.g. −150 dBc/Hz at 10 kHz offset for 30 GHz carrier) [18].

In some examples low-phase-noise microwave electrical signals can be generated from the pump optical signals 21/22 generated by the SIL pump laser source 21/22, without relying on stimulated Brillouin laser generation. Due to the two SIL pump laser sources 201/202 being locked to the same resonator 100, the common-mode technical frequency noise of the pump optical signals 21/22, resulting from thermal, acoustic, and other environmental perturbations, significantly cancels out. In some examples the two SIL pump optical signals 21/22 can be directed (e.g., via the output waveguide 130, or via the input waveguide 120 acting as a through port) onto a fast photodetector to generate a different frequency $f_{diff} = |v_{2P} - v_{1P}|$ by beating of the signals 21/22 on the photodetector (analogous to FIG. 3). The frequency stability of the SIL pump optical signals 21/22 translates into a relatively stable difference frequency $f_{diff}$. The difference frequency is limited by the speed of the photodetector, e.g., to less than 200 GHz or less than 100 GHz.

Figure 5:
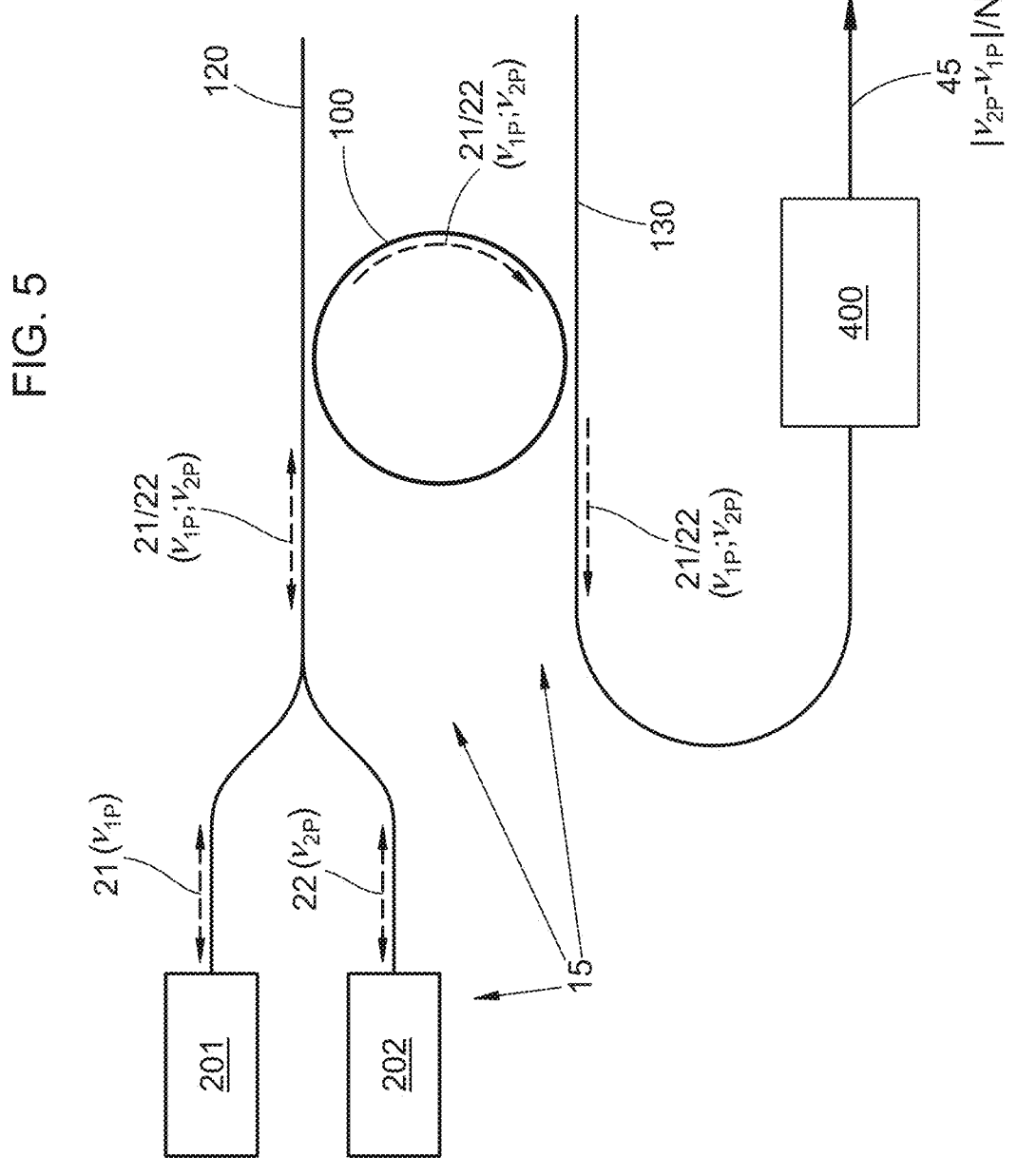
FIG. 5 illustrates schematically use of dual optical signals of example dual self-injection-locked lasers to produce an electrical output signal using an optical frequency divider.

In some examples the SIL pump optical signals 21/22 at their corresponding pump optical frequencies $v_{1P}$ and $v_{2P}$ can be used as an optical reference using a suitably fast photodetector (in a manner analogous to FIG. 3), or using a frequency divider 400 (in a manner analogous to FIG. 4; e.g., as in FIG. 5). In the example of FIG. 5 two SIL pump optical signals 21/22 can be directed (e.g., by the output waveguide 130, or by the input waveguide 120 acting as a through port) to a frequency divider 400 of any suitable type or arrangement. The phase noise for the generated microwave signal 45 is divided by a factor of $N^2$ from the optical reference phase noise, where the integer N is the approximate frequency ratio between the optical reference frequency (i.e., $|v_{2P} - v_{1P}|$) and the microwave output frequency (i.e., $|v_{2P} - v_{1P}|/N$). Any suitable optical frequency divider 400 can be employed using any suitable frequency division technique, such as, e.g., using a mode locked laser comb [16], using a microresonator comb (microcomb) [21], or using an electro-optical comb [17, 18], or using any other suitable technique or arrangement, including those described above or in the incorporated references.

In any of the arrangements described above, the pump optical frequencies can be altered by, e.g., using different semiconductor laser diodes, or by tuning the temperature or current of each pump laser source 201/202. Self-injection locking for each pump laser source 201/202, to differing resonant modes of the optical resonator 100 as the pump optical frequencies are tuned, tends to suppress the free-running frequency noise of the semiconductor laser by orders of magnitudes [4, 5]. Each of the pump laser sources 201/202 would be expected to have good relative frequency stability, and even lower frequency noise for their frequency difference $|v_{2P}-v_{1P}|$, due to the common mode cancellation of thermal and environmental perturbations described above.

In addition to the preceding, the following example embodiments fall within the scope of the present disclosure or appended claims. Any given Example below that refers to multiple preceding Examples shall be understood to refer to only those preceding Examples with which the given Example is not inconsistent, and to exclude implicitly those preceding Examples with which the given Example is inconsistent.

Example 1. An apparatus comprising: (a) a ring optical resonator characterized by a Brillouin shift frequency $\Omega_a$ and a free spectral range $v_{FSR}$; and (b) a first pump laser source that arranged so as to (i) produce a first pump optical signal at a first pump optical frequency $v_{1P}$, and (ii) launch at least a portion of the first pump optical signal into the ring optical resonator to propagate in a forward direction around the ring optical resonator, the ring optical resonator and the first pump laser source being arranged so that: (c) a portion of the first pump optical signal backscattered by the ring optical resonator propagates back to the first pump laser source and injection-locks the first pump laser source so that the first pump optical frequency $v_{1P}$ is locked to a first resonant mode optical frequency of the ring optical resonator; and (d) a portion of the first pump optical signal circulating in the ring optical resonator results in a first stimulated Brillouin laser (SBL) optical signal at a first SBL optical frequency $v_1=v_{1P}-\Omega_a$ that resonantly propagates in a backward direction around the ring optical resonator and is emitted from a resonant optical mode of the ring optical resonator at a resonant mode optical frequency that is lower than the first resonant mode optical frequency.

Example 2. The apparatus of Example 1 further comprising (e) a second pump laser source that arranged so as to (i) produce a second pump optical signal at a second pump optical frequency $v_{2P}$, and (ii) launch at least a portion of the second pump optical signal into the ring optical resonator to propagate in a forward direction around the ring optical resonator, the ring optical resonator and the second pump laser source being arranged so that: (f) a portion of the second pump optical signal backscattered by the ring optical resonator propagates back to the second pump laser source and injection-locks the second pump laser source so that the second pump optical frequency $v_{2P}$ is locked to a second resonant mode optical frequency of the ring optical resonator different from the first resonant mode optical frequency; and (g) a portion of the second pump optical signal circulating in the ring optical resonator results in a second SBL optical signal at a second SBL optical frequency $v_2=v_{2P}-\Omega_a$ that resonantly propagates in a backward direction around the ring optical resonator and is emitted from a resonant optical mode of the ring optical resonator at a resonant mode optical frequency that is lower than the second resonant mode optical frequency.

Example 3. The apparatus of any one of Examples 1 or 2 wherein $\Omega_a$ is about equal to $v_{FSR}$ or an integer multiple of $v_{FSR}$.

Example 4. The apparatus of any one of Examples 1 through 3 wherein the optical resonator comprises silica and the Brillouin shift frequency $\Omega_a$ of the optical resonator is about 10.9 GHz.

Example 5. The apparatus of any one of Examples 2 through 4 further comprising an optical detector arranged so as (i) to receive at least a portion of the first SBL optical signal and at least a portion of the second SBL optical signal, and (ii) to generate therefrom an electrical output signal at a difference frequency $v_{DIFF}=|v_2-v_1|$ that is less than 300 GHz, less than 200 GHz, or less than 100 GHz.

Example 6. The apparatus of Example 5 wherein the difference frequency $v_{DIFF}=|v_2-v_1|$ is greater than 0.3 GHz, greater than 1 GHz, greater than 5 GHz, less than 300 GHz, less than 100 GHz, or less than 50 GHz.

Example 7. The apparatus of any one of Examples 5 or 6 wherein (i) the difference frequency $v_{DIFF}=|v_2-v_1|$ exhibits fluctuations over a 0.1 second timescale only within a bandwidth less than 100 Hz, or (ii) the output electrical signal exhibits phase noise less than $-80$ dBc/Hz at 10 kHz offset frequency.

Example 8. The apparatus of any one of Examples 5 or 6 wherein (i) the difference frequency $v_{DIFF}=|v_2-v_1|$ exhibits fluctuations over a 0.1 second timescale only within a bandwidth less than 1 Hz, or (ii) the output electrical signal exhibits phase noise less than $-100$ dBc/Hz at 10 kHz offset frequency.

Example 9. The apparatus of any one of Examples 2 through 4 further comprising an optical frequency divider arranged so as (i) to receive at least a portion of the first SBL optical signal and at least a portion of the second SBL optical signal, and (ii) to generate therefrom an electrical output signal at a divided frequency about equal to $|v_2-v_1|/N$, with N being an integer and $|v_2-v_1|$ being greater than 100 GHz, greater than 200 GHz, greater than 300 GHz, greater than 500 GHz, greater than 1 THz, greater than 10 THz, or greater than 100 THz.

Example 10. The apparatus of Example 9 wherein the divided frequency is greater than 0.3 GHz, greater than 1 GHz, greater than 5 GHz, less than 300 GHz, less than 100 GHz, or less than 50 GHz.

Example 11. The apparatus of any one of Examples 9 or 10 wherein (i) the difference frequency $v_{DIFF}=|v_2-v_1|$ exhibits fluctuations over a 0.1 second timescale only within a bandwidth less than 100 Hz, or (ii) the output electrical signal exhibits phase noise less than $-80-20\cdot\log N$ dBc/Hz at 10 kHz offset frequency.

Example 12. The apparatus of any one of Examples 9 or 10 wherein (i) the difference frequency $v_{DIFF}=|v_2-v_1|$ exhibits fluctuations over a 0.1 second timescale only within a bandwidth less than 1 Hz, or (ii) the output electrical signal exhibits phase noise less than $-100-20\cdot\log N$ dBc/Hz at 10 kHz offset frequency.

Example 13. An apparatus comprising: (a) a ring optical resonator; and (b) a first pump laser source that arranged so as to (i) produce a first pump optical signal at a first pump optical frequency $v_{1P}$, and (ii) launch at least a portion of the first pump optical signal into the ring optical resonator to propagate in a forward direction around the ring optical resonator, (c) the ring optical resonator and the first pump laser source being arranged so that a portion of the first pump optical signal backscattered by the ring optical resonator propagates back to the first pump laser source and injection-locks the first pump laser source so that the first pump optical frequency $v_{1P}$ is locked to a first resonant mode optical frequency of the ring optical resonator.

Example 14. The apparatus of Example 13 (d) further comprising a second pump laser source that arranged so as to (i) produce a second pump optical signal at a second pump optical frequency $v_{2P}$, and (ii) launch at least a portion of the second pump optical signal into the ring optical resonator to propagate in a forward direction around the ring optical resonator, (e) the ring optical resonator and the second pump laser source being arranged so that a portion of the second pump optical signal backscattered by the ring optical resonator propagates back to the second pump laser source and injection-locks the second pump laser source so that the second pump optical frequency $v_{2P}$ is locked to a second resonant mode optical frequency of the ring optical resonator different from the first resonant mode optical frequency.

Example 15. The apparatus of Example 14 further comprising an optical detector arranged so as (i) to receive at least a portion of the first pump optical signal and at least a portion of the second pump optical signal, and (ii) to generate therefrom an electrical output signal at a difference frequency $v_{DIFF}=|v_{2P}-v_{1P}|$ that is less than 300 GHz, less than 200 GHz, or less than 100 GHz.

Example 16. The apparatus of Example 15 wherein the difference frequency $v_{DIFF}=|v_2-v_1|$ is greater than 0.3 GHz, greater than 1 GHz, greater than 5 GHz, less than 300 GHz, less than 100 GHz, or less than 50 GHz.

Example 17. The apparatus of any one of Examples 15 or 16 wherein (i) the difference frequency $v_{DIFF}=|v_2-v_1|$ exhibits fluctuations over a 0.1 second timescale only within a bandwidth less than 100 Hz, or (ii) the output electrical signal exhibits phase noise less than −80 dBc/Hz at 10 kHz offset frequency.

Example 18. The apparatus of any one of Examples 15 or 16 wherein (i) the difference frequency $v_{DIFF}=|v_2-v_1|$ exhibits fluctuations over a 0.1 second timescale only within a bandwidth less than 1 Hz, or (ii) the output electrical signal exhibits phase noise less than −100 dBc/Hz at 10 kHz offset frequency.

Example 19. The apparatus of Example 14 further comprising an optical frequency divider arranged so as (i) to receive at least a portion of the first pump optical signal and at least a portion of the second pump optical signal, and (ii) to generate therefrom an electrical output signal at a divided frequency about equal to $|v_{2P}-v_{1P}|/N$, with N being an integer and $|v_{2P}-v_{1P}|$ being greater than 100 GHz, greater than 200 GHz, greater than 300 GHz, greater than 500 GHz, greater than 1 THz, greater than 10 THz, or greater than 100 THz.

Example 20. The apparatus of Example 19 wherein the divided frequency is greater than 0.3 GHz, greater than 1 GHz, greater than 5 GHz, less than 300 GHz, less than 100 GHz, or less than 50 GHz.

Example 21. The apparatus of any one of Examples 19 or 20 wherein (i) the difference frequency $v_{DIFF}=|v_2-v_1|$ exhibits fluctuations over a 0.1 second timescale only within a bandwidth less than 100 Hz, or (ii) the output electrical signal exhibits phase noise less than −80−20·log N dBc/Hz at 10 kHz offset frequency.

Example 22. The apparatus of any one of Examples 19 or 20 wherein (i) the difference frequency $v_{DIFF}=|v_2-v_1|$ exhibits fluctuations over a 0.1 second timescale only within a bandwidth less than 1 Hz, or (ii) the output electrical signal exhibits phase noise less than −100−20·log N dBc/Hz at 10 kHz offset frequency.

Example 23. The apparatus of any preceding Example wherein the first pump laser source is, or one or both of the first or second pump lasers sources are, semiconductor diode lasers.

Example 24. The apparatus of any preceding Example wherein the first pump optical frequency $v_{1P}$ is, or one or both of the first or second pump optical frequencies $v_{1P}$ and $v_{2P}$ are, greater than 75 THz, greater than 120 THz, greater than 150 THz, less than 300 THz, less than 430 THz, or less than 750 THz.

Example 25. The apparatus of any preceding Example wherein the ring optical resonator comprises a ring waveguide optical resonator on a substrate, a disk optical resonator, or a fiber-loop optical resonator.

Example 26. The apparatus of any preceding Example wherein the optical resonator exhibits a Q-factor greater than $10^4$, greater than $10^5$, greater than $10^6$, greater than $10^7$, or greater than $10^8$.

This disclosure is illustrative and not limiting. Further modifications will be apparent to one skilled in the art in light of this disclosure and are intended to fall within the scope of the present disclosure or appended claims. It is intended that equivalents of the disclosed example embodiments and methods, or modifications thereof, shall fall within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore, the present disclosure shall be construed as implicitly disclosing any embodiment having any suitable subset of one or more features—which features are shown, described, or claimed in the present application—including those subsets that may not be explicitly disclosed herein. A "suitable" subset of features includes only features that are neither incompatible nor mutually exclusive with respect to any other feature of that subset. Accordingly, the appended claims are hereby incorporated in their entirety into the Detailed Description, with each claim standing on its own as a separate disclosed embodiment. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the cumulative scope of the appended claims can, but does not necessarily, encompass the whole of the subject matter disclosed in the present application.

The following interpretations shall apply for purposes of the present disclosure and appended claims. The words "comprising," "including," "having," and variants thereof, wherever they appear, shall be construed as open ended terminology, with the same meaning as if a phrase such as "at least" were appended after each instance thereof, unless explicitly stated otherwise. The article "a" shall be interpreted as "one or more" unless "only one," "a single," or other similar limitation is stated explicitly or is implicit in the particular context; similarly, the article "the" shall be interpreted as "one or more of the" unless "only one of the," "a single one of the," or other similar limitation is stated explicitly or is implicit in the particular context. The conjunction "or" is to be construed inclusively unless: (i) it is explicitly stated otherwise, e.g., by use of "either . . . or," "only one of," or similar language; or (ii) two or more of the listed alternatives are understood or disclosed (implicitly or explicitly) to be incompatible or mutually exclusive within the particular context. In that latter case, "or" would be understood to encompass only those combinations involving non-mutually-exclusive alternatives. In one example, each of "a dog or a cat," "one or more of a dog or a cat," and "one or more dogs or cats" would be interpreted as one or more dogs without any cats, or one or more cats without any dogs, or one or more of each.

For purposes of the present disclosure or appended claims, when a numerical quantity is recited (with or without terms such as "about," "about equal to," "substantially equal to," "greater than about," "less than about," and so forth), standard conventions pertaining to measurement precision, rounding error, and significant digits shall apply, unless a differing interpretation is explicitly set forth, or if a differing interpretation is implicit or inherent (e.g., small integer quantities). For null quantities described by phrases such as "prevented," "absent," "eliminated," "equal to zero," "negligible," and so forth (with or without terms such as "about," "substantially," and so forth), each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled. Terms such as "parallel," "perpendicular," "orthogonal," "flush," "aligned," and so forth shall be similarly interpreted (with or without terms such as "about," "substantially," and so forth).

For purposes of the present disclosure and appended claims, any labelling of elements, steps, limitations, or other portions of an embodiment, example, or claim (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. An apparatus comprising:
a ring optical resonator characterized by a Brillouin shift frequency $\Omega_a$ and a free spectral range $\nu_{FSR}$; and
a first pump laser source that arranged so as to (i) produce a first pump optical signal at a first pump optical frequency $\nu_{1P}$, and (ii) launch at least a portion of the first pump optical signal into the ring optical resonator to propagate in a forward direction around the ring optical resonator,
the ring optical resonator and the first pump laser source being arranged so that:
a portion of the first pump optical signal backscattered by the ring optical resonator propagates back to the first pump laser source and injection-locks the first pump laser source so that the first pump optical frequency $\nu_{1P}$ is locked to a first resonant mode optical frequency of the ring optical resonator; and
a portion of the first pump optical signal circulating in the ring optical resonator results in a first stimulated Brillouin laser (SBL) optical signal at a first SBL optical frequency $\nu_1 = \nu_{1P} - \Omega_a$ that resonantly propagates in a backward direction around the ring optical resonator and is emitted from a resonant optical mode of the ring optical resonator at a resonant mode optical frequency that is lower than the first resonant mode optical frequency.

2. The apparatus of claim 1 further comprising a second pump laser source that arranged so as to (i) produce a second pump optical signal at a second pump optical frequency $\nu_{2P}$, and (ii) launch at least a portion of the second pump optical signal into the ring optical resonator to propagate in a forward direction around the ring optical resonator, the ring optical resonator and the second pump laser source being arranged so that:
a portion of the second pump optical signal backscattered by the ring optical resonator propagates back to the second pump laser source and injection-locks the second pump laser source so that the second pump optical frequency $\nu_{2P}$ is locked to a second resonant mode optical frequency of the ring optical resonator different from the first resonant mode optical frequency; and
a portion of the second pump optical signal circulating in the ring optical resonator results in a second SBL optical signal at a second SBL optical frequency $\nu_2 = \nu_{2P} - \Omega_a$ that resonantly propagates in a backward direction around the ring optical resonator and is emitted from a resonant optical mode of the ring optical resonator at a resonant mode optical frequency that is lower than the second resonant mode optical frequency.

3. The apparatus of claim 2 wherein $\Omega_a$ is about equal to $\nu_{FSR}$ or an integer multiple of $\nu_{FSR}$.

4. The apparatus of claim 2 wherein the optical resonator comprises silica and the Brillouin shift frequency $\Omega_a$ of the optical resonator is about 10.9 GHz.

5. The apparatus of claim 2 further comprising an optical detector arranged so as to (i) to receive at least a portion of the first SBL optical signal and at least a portion of the second SBL optical signal, and (ii) to generate therefrom an electrical output signal at a difference frequency $\nu_{DIFF} = |\nu_2 - \nu_1|$ that is less than 300 GHz.

6. The apparatus of claim 5 wherein the difference frequency $\nu_{DIFF} = |\nu_2 - \nu_1|$ is greater than 0.3 GHz.

7. The apparatus of claim 5 wherein (i) the difference frequency $\nu_{DIFF} = |\nu_2 - \nu_1|$ exhibits fluctuations over a 0.1 second timescale only within a bandwidth less than 100 Hz, or (ii) the output electrical signal exhibits phase noise less than −80 dBc/Hz at 10 kHz offset frequency.

8. The apparatus of claim 5 wherein (i) the difference frequency $\nu_{DIFF} = |\nu_2 - \nu_1|$ exhibits fluctuations over a 0.1 second timescale only within a bandwidth less than 1 Hz, or (ii) the output electrical signal exhibits phase noise less than −100 dBc/Hz at 10 kHz offset frequency.

9. The apparatus of claim 2 further comprising an optical frequency divider arranged so as (i) to receive at least a portion of the first SBL optical signal and at least a portion of the second SBL optical signal, and (ii) to generate therefrom an electrical output signal at a divided frequency about equal to $|\nu_2 - \nu_1|/N$, with N being an integer and $|\nu_2 - \nu_1|$ being greater than 100 GHz.

15

16

10. The apparatus of claim 9 wherein the divided frequency is greater than 0.3 GHz.

11. The apparatus of claim 9 wherein (i) the difference frequency $v_{DIFF}=|v_2-v_1|$ exhibits fluctuations over a 0.1 second timescale only within a bandwidth less than 100 Hz, or (ii) the output electrical signal exhibits phase noise less than $-80-20 \cdot \log N$ dBc/Hz at 10 kHz offset frequency.

12. The apparatus of claim 9 wherein (i) the difference frequency $v_{DIFF}=|v_2-v_1|$ exhibits fluctuations over a 0.1 second timescale only within a bandwidth less than 1 Hz, or (ii) the output electrical signal exhibits phase noise less than $-100-20 \cdot \log N$ dBc/Hz at 10 kHz offset frequency.

13. The apparatus of claim 2 wherein one or both of the first or second pump lasers sources are semiconductor diode lasers.

14. The apparatus of claim 2 wherein one or both of the first or second pump optical frequencies $v_{1P}$ and $v_{2P}$ are greater than 75 THz or less than 750 THz.

15. The apparatus of claim 2 wherein the ring optical resonator comprises a ring waveguide optical resonator on a substrate.

16. The apparatus of claim 2 wherein the ring optical resonator comprises a disk optical resonator.

17. The apparatus of claim 2 wherein the ring optical resonator comprises a fiber-loop optical resonator.

18. The apparatus of claim 2 wherein the optical resonator exhibits a Q-factor greater than $10^6$.

19. The apparatus of claim 1 wherein the ring optical resonator comprises a ring waveguide optical resonator on a substrate.

20. The apparatus of claim 1 wherein the ring optical resonator comprises a disk optical resonator.

21. The apparatus of claim 1 wherein the ring optical resonator comprises a fiber-loop optical resonator.

* * * * *